(12) United States Patent
Ladisch et al.

(10) Patent No.: US 7,410,709 B2
(45) Date of Patent: Aug. 12, 2008

(54) BIO-BATTERY

(75) Inventors: Michael R. Ladisch, West Lafayette, IN (US); Nathan S. Mosier, West Lafayette, IN (US); Eric M. Perkins, Crossett, AR (US)

(73) Assignee: Purdue Research Foundation, West Lafayette, IN (US)

( * ) Notice: Subject to any disclaimer, the term of this patent is extended or adjusted under 35 U.S.C. 154(b) by 311 days.

(21) Appl. No.: 10/875,990

(22) Filed: Jun. 24, 2004

(65) Prior Publication Data

US 2005/0287399 A1 Dec. 29, 2005

(51) Int. Cl.
*H01M 8/16* (2006.01)
(52) U.S. Cl. .................. 429/2; 204/403.01; 204/403.02; 204/403.03; 204/403.04; 204/403.05; 204/403.06; 204/403.07; 204/403.08; 204/403.09; 204/403.1; 204/403.11; 204/403.12; 204/403.13; 204/403.14
(58) Field of Classification Search ....................... 429/2
See application file for complete search history.

(56) References Cited

U.S. PATENT DOCUMENTS 6,500,571 B2   12/2002   Liberatore et al.

OTHER PUBLICATIONS

Gorton, J Chem. Soc., Faraday Tras., 1, 1986, 82, 1245-1258.*
Bond, D.R. et al., "Electrode-Reducing Microorganisms That Harvest Energy from Marine Sediments," *Science Magazine*, vol. 295, Jan. 18, 2002, pp. 483-485.
Chaudhuri, S.K. et al., "Electricity Generation by Direct Oxidation of Glucose in Mediatorless Microbial Fuel Cells", *Nature Biotechnology*, (published online Sep. 7, 2003), vol. 21, No. 10, Oct. 2003, pp. 1229-1232.
Chen, T. et al., "A Miniature Biofuel Cell", *J. Am. Chem. Soc.*, vol. 123, Aug. 11, 2001, pp. 8630-8631.
Cortright, R.D. et al., "Hydrogen from Catalytic Reforming of Biomass-derived Hydrocarbons in Liquid Water", *Nature Publishing Group*, vol. 418, Aug. 29, 2002, pp. 964-967.
DeLong, E.F. et al., "Power from the Deep", *Nature Biotechnology*, vol. 20, Aug. 2002, pp. 788-789.
Demmig-Adams B., et al., "Antioxidants in Photosynthesis and Human Nutrition", *Science Magazine*, vol. 298, Dec. 13, 2002, pp. 2149-2153.
Geddes, L.A., "Electrodes and the Measurement of Bioelectric Events", *Wiley-Interscience*, 1972, pp. 3-43.
Harrison, K.E. et al., "Surface Structure and Composition of Thiophene-Bearing Monolayers", *J. Am. Chem. Soc.*, vol. 17, Sep. 22, 2001, pp. 6560-6568.

(Continued)

*Primary Examiner*—Patrick Ryan
*Assistant Examiner*—Cynthia K. Lee
(74) *Attorney, Agent, or Firm*—Brinks Hofer Gilson & Lione

(57) ABSTRACT

A bio-battery includes a biomolecular energy source, a first electrode and a second electrode. In some configurations, a bio-battery may also include a first cell containing the first electrode and the biomolecular energy source, and a second cell having a reducible substrate and the second electrode. The first cell can be in ionic communication with the second cell, for example by a proton exchange membrane. Various biomolecular energy sources can be used, including proton donor molecules or electrolytically oxidizable molecules. For example, the biomolecular energy source can be selected from the group consisting of Nicotinamide Adenine Dinucleotide (NADH), Nicotinamide Adenine Dinucleotide Phosphate (NADPH) and 5,10-Methylenetetrahydrofolate Reductase (FADH).

16 Claims, 8 Drawing Sheets

OTHER PUBLICATIONS

Jacoby, M., "Fuel Cells Minus Membranes", *J. Am. Chem. Soc.*, vol. 82, Mar. 29, 2004, p. 7.

Katz, E. et al., "A Non-compartmentalized glucose/oxygen biofuel cell by bioengineered electrode surfaces", *J. Electroanalytical Chem.*, vol. 479, Oct. 15, 1999, pp. 64-68.

Kilbey II, S.M. et al., "Structure and Scaling of Polymer Brushes near the Theta Condition", *J. Am. Chem. Soc.*, vol. 34, Jun. 21, 2001, pp. 5249-5259.

McCusker, J. K., "Fuel from Photons", *Science Magazine*, vol. 293, Aug. 31, 2001, pp. 1599-1600.

Newman, D.K. et al., "Geomicrobiology: How Molecular-Scale Interactions Underpin Biogeochemical Systems", *Science Magazine*, vol. 296, May 10, 2002, pp. 1071-1077.

Park, D.H. et al., "Improved Fuel Cell and Electrode Designs for Producing Electricity from Microbial Degradation", *Wiley Periodicals*, vol. 81, Jul. 16, 2002, pp. 348-355.

Rao, J.R. et al., "Metal-oxygen and Glucose-oxygen Cells for Implantable Devices", *Biochemical Engineering*, March, 98-103.

Ritter, S., "Biofuel Cells Get Smaller", *J. Am. Chem. Soc.*, available at http://pubs.acs.org/cen, Sep. 3, 2001, p. 10.

Service, R., "Shrinking Fuel Cells Promise Power in Your Pocket", *Science Magazine*, vol. 296, May 17, 2002, pp. 1222-1224.

Sullivan J.T., et al., "Contact Angle and Electrochemical Characterization of Multicomponent Thiophene-Capped Monolayers", *J. Am. Chem. Soc.*, vol. 16, Nov. 11, 2000, pp. 9797-9803.

Ussing, H.H. et al., "Active Transport of Sodium as the Source of Electric Current in the Short-circuited Isolated Frog Skin", *Acta. Physiol. Scand*, vol. 23, 1951, pp. 110-127.

Verheij, L.K. et al., "On the mechanism of the hydrogen-oxygen reaction on Pt(111)", *Surface Science*, vol. 416, May 28, 1998, 37-58.

Willner, I. et al., "Electrical Wiring of Glucose Oxidase by Reconstitution of FAD-Modified Monolayers Assembled onto Au-Electrodes", *J. Am. Chem. Soc.*, Mar. 18, 1996, pp. 10321-10322.

Yahiro, A.T. et al., "Enzyme Utilizing Bio-Fuel Cell Studies", *Biochim. Biophys. Acta*, vol. 88, Dec. 31, 1963, pp. 375-383.

Zvitov, R. et al., "Physicochemical Properties and Structural Changes in Vegatative Tissues as Affected by a Direct Current Electrical Field", *J. Am. Chem. Soc.*, vol. 17, Nov. 17, 2001, pp. 1099-1106.

G. Tayhas R. Palmore, Hugo Bertschy, Steven H. Bergens, George M. Whitesides, "A methanol/dioxygen biofuel cell that uses NAD+-dependent dehydrogenases as catalysts: application nof an electroenzymatic method to regenerate nicotinamide adenine dinucleotide at low overpotentials," *Journal of Electroanalytical Chemistry* 443 (1998) 155-161.

* cited by examiner

BIO-BATTERY

ACKNOWLEDGMENT OF FEDERAL RESEARCH SUPPORT

Work for this invention was partially funded by a grant from the United States National Science Foundation, NSF Grant No. 9987576. The government may have certain rights in this invention.

TECHNICAL FIELD

This application relates to batteries. In particular, this application relates to bio-batteries that provide an electrical potential from a biomolecular energy source.

BACKGROUND OF THE INVENTION

There exists a continuing need for a portable source of energy. Bio-fuel cells convert hydrogen-rich fuel, such as hydrogen or methanol, into electric current. In a bio-fuel cell, electrochemical reactions may take place inside a chamber containing two electrodes that are separated into a first cell and a second cell by a membrane that allows for selective transport of ions. Hydrogen molecules are oxidized in the first cell at a relatively negatively charged conductive anode to generate protons and electrons that may be conducted through the anode. Catalysts may be used to facilitate reduction oxidation of the hydrogen. The electrons can travel through an electrical circuit when an electrical potential exists between the anode and cathode. The protons in the first cell can diffuse through the membrane to the second cell, which contains a relatively positively charged cathode electrode. Subsequently, oxygen molecules are reduced at the cathode electrode where oxygen may be combined with electrons and protons to form water.

Hydrogen-consuming fuel cells may be extremely efficient, but pure hydrogen may require storage in pressurized tanks and other precautions. One common type of micro fuel cell is based on methanol. Methanol is a liquid fuel with a high energy density and is plentiful and inexpensive. However, methanol fuel cells do not always work at high efficiency. Methanol may also block the reactions that form water.

Fuel cells may use enzymes to carry out the reactions. For example, one or more enzymes may be localized in the region of separate electrodes to ensure that the proper reactions occur at the desired location. For example, the enzyme glucose oxidase may be maintained in the region of an anode in the presence of glucose to oxidize glucose thereby converting the glucose sugar molecule to gluconolactone and a pair of hydrogen ions. Hydrogen ions then migrate through a semi-permeable membrane to the cathode. Similarly, an enzyme called laccase may be maintained in the region of the cathode. In the presence of oxygen, laccase can combine the protons with oxygen and electrons to produce water. However, the activity of laccase is pH dependent. Since laccase enzymes typically work best in environments much more acidic than the pH 7.0, laccase-based fuel cells do not produce a high yield of power.

Moreover, many existing chemical and metal batteries present numerous challenges to manufacture as well as challenges to develop disposal practices that are not environmentally detrimental. Thus, there is a need for bio-batteries that are re-usable, disposable, and environmentally safe. There is also a need for bio-batteries that weigh less and have an increased power output and battery life.

SUMMARY OF THE INVENTION

This application relates to a bio-battery including a first cell having a biomolecular energy source and a first electrode. The bio-battery also includes a second cell having a reducible substrate and a second electrode. The biomolecular energy is in ionic communication with the reducible substrate. The first electrode is in oxidizing contact with the biomolecular energy source. The second electrode is in reducing contact with the reducible substrate. The first electrode is in electrically conductive communication with the second electrode. The biomolecular energy source is any suitable electrolytically oxidizable biomolecule. The biomolecular energy source may be selected from the group consisting of Nicotinamide Adenine Dinucleotide (NADH), Nicotinamide Adenine Dinucleotide Phosphate (NADPH) and 5,10-Methylenetetrahydrofolate Reductase (FADH), however other biomolecular energy sources may also be used.

The biomolecular energy source may be oxidized at the first electrode of the first cell. Oxidation of the biomolecular energy source generates electrons and may also produce protons. The first electrode may be an anode, and is connected by an electrically conductive means to the second electrode, the cathode. Electrons migrate through the electrically conductive means, for example, from the first electrode to the second electrode and produce an electric current when a resistor is in place along a wire. The protons may migrate through the proton exchange membrane from the first cell into the second cell. Oxygen molecules acting as the reducible substrate in the second cell may be reduced by the electrons at the second electrode and combine with the protons to form water.

The bio-molecule energy source may be regenerated by enzymes. In the first cell, the enzymes are selected and maintained with a substrate to regenerate the biomolecular energy source by converting the oxidized biomolecular back to the reduced biomolecular, which may be oxidized again to generate electric current as discussed above.

Moreover, in the presence of nutrients, microorganisms may be used to regenerate the biomolecular energy source in the first cell. In the first cell, the microorganisms are selected and maintained with a nutrient to regenerate the biomolecular energy source by converting the oxidized biomolecular back to the reduced biomolecular. The resulting biomolecular energy source may then be oxidized to generate electric current as discussed above.

DETAILED DESCRIPTION

A bio-battery may provide an electrical potential from a variety of biomolecular energy sources. Biomolecular energy sources include Nicotinamide Adenine Dinucleotide (NADH), Nicotinamide Adenine Dinucleotide Phosphate (NADPH) and 5,10-Methylenetetrahydrofolate Reductase (FADH). Various other compounds can be used as biomolecular energy sources including various hydrogen donor compounds, including aromatic compounds. One specific example of a reaction by which a biomolecular energy source can be used to produce an electrical potential in a bio-battery is the oxidation of Nicotinamide Adenine Dinucleotide (NADH) to Nicotinamide Adenine Dinucleotide (NAD$^+$). The oxidation of NADH can also be coupled with the reduction of another molecule such as oxygen to water in the bio-battery.

A "biomolecule" includes, for example, an organic molecule in living organisms.

An "electrolytically oxidazable biomolecule" includes, for example, a biomolecule that may be oxidized at an electrode to provide a source of electrons.

"In ionic communication" includes, for example, protons in a cell that may be transported, such as by diffusion though the proton exchange membrane to another cell.

"In oxidizing contact" includes, for example, contact that allows an oxidizing reaction to occur, such as at an electrode with a biomolecular energy source.

"In reducing contact" includes, for example, contact that allows a reducing reaction to occur, such as at an electrode with a reducing substrate.

"In electrically conductive communication" includes, for example, communication that allows for conduction of electrons. For example, an electrode may be connected to another electrode by a conductive path and a resistor.

Figure 1:
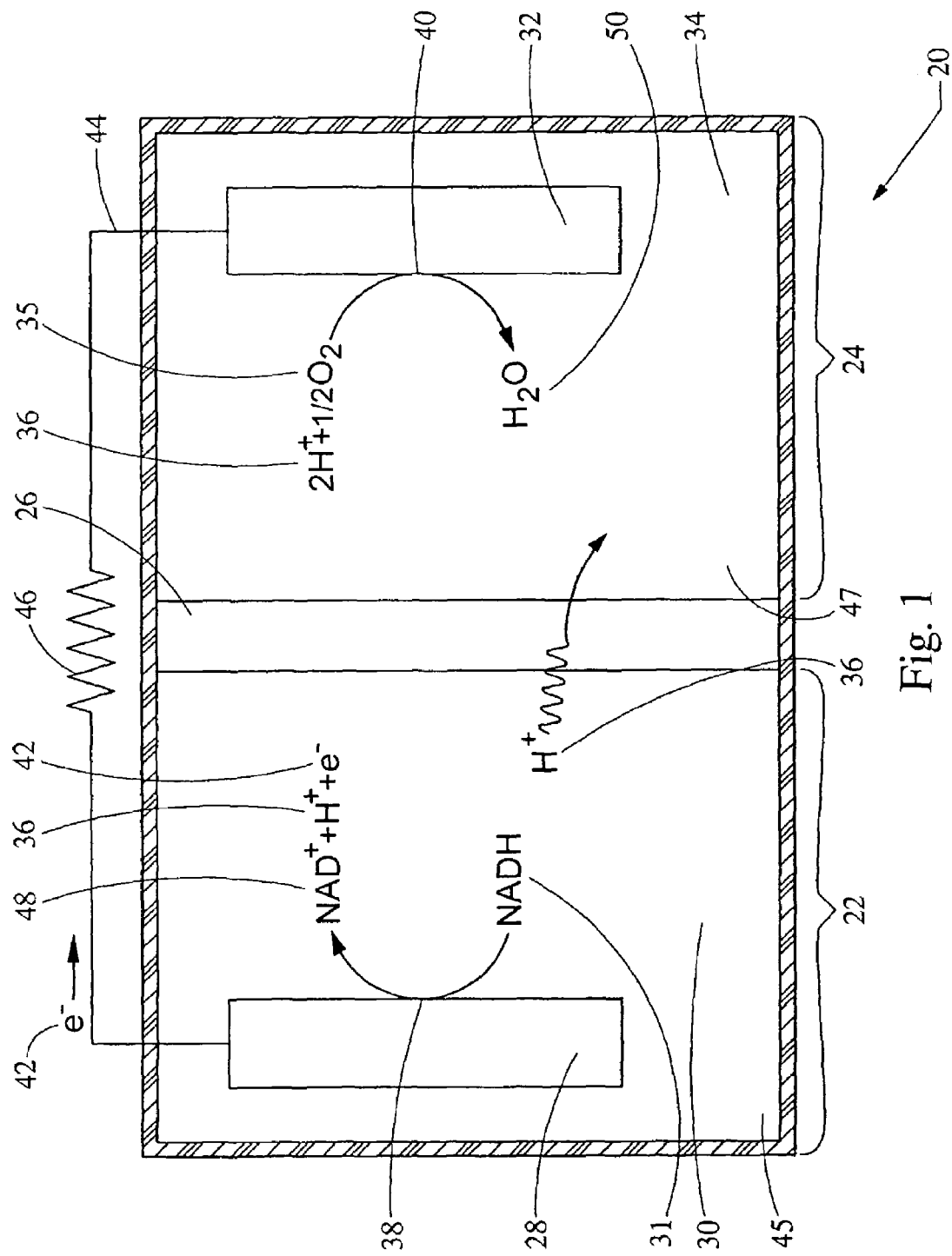
FIG. 1 depicts a schematic view of a bio-battery.

A bio-battery 20 shown in FIG. 1 includes a first cell 22 having a biomolecular energy source 30 and a first electrode 28. The bio-battery 20 also includes a second cell 24 having a reducible substrate 34 and a second electrode 32. The biomolecular energy source 30 is in ionic communication with the reducible substrate 34, for example by a proton exchange membrane 26. The first electrode 28 is in contact 38 with the biomolecular energy source 30. The contact 38 can be an oxidizing contact when an electrical potential is generated between the first electrode 28 and the second electrode 32. The second electrode 32 is in contact 40 with the reducible substrate 34. The contact 40 can be a reducing contact when an electrical potential is generated between the first electrode 28 and the second electrode 32. The first electrode 28 can be in electrically conductive communication with the second electrode 32, for example when the bio-battery is in use. The biomolecular energy source 30 is an electrolytically oxidizable molecule. For example, the biomolecular energy source 30 can be a proton donor, including an aromatic compound. The biomolecular energy source 30 can also be selected from the group consisting of Nicotinamide Adenine Dinucleotide (NADH), Nicotinamide Adenine Dinucleotide Phosphate (NADPH) and 5,10-Methylenetetrahydrofolate Reductase (FADH). The concentration of the biomolecular energy source can be varied to produce a desired electrical potential. For example, concentrations of about 1 mg/ml, up to 10% w/v or higher of the biomolecular energy source can be used.

As shown in FIG. 1, the biomolecular energy source 30 in the first cell 22 may include NADH 31, such as that manufactured by Sigma® under the name Sigma-Aldrich Co. However, any other biomolecular energy source 30 that can provide a source of electrons 42 at the first electrode 28, such as FADH and NADPH, may also be used. The reducible substrate 34 in the second cell 24 may be an oxygen molecule 35. The first electrode 28 may be a carbon anode, and the second electrode 32 may be a platinum cathode, although electrodes made of any other suitable materials may also be used. The conductive path 44 may be an electrically conducting conduit, such as a wire. Any suitable material capable of conducting electricity may be used as a conductive path 44.

The bio-battery can also include a proton exchange membrane or suitable boundary layer. In FIG. 1, the bio-battery 20 includes a proton exchange membrane 26 that may have a thickness of at least about 10 nm. For example, a NAFION® membrane (DuPont, NC) type N112 with a nominal thickness of 0.051 mm may be used, although other proton exchange membranes 26 and membrane thicknesses may also be used. Various types of boundary layers can be included at or near the surfaces of the electrodes. Certain boundary layers can be used in place of a proton exchange membrane. For example, a boundary layer at or near the surface of an electrode may compartmentalize the oxidation of NADH to NAD$^+$ from the reduction of oxygen in the absence of a proton exchange membrane.

The first cell 22 may contain an aqueous medium 45 and the second cell 24 may contain another aqueous medium 47, for example, deionized water. Any other suitable ionic transport media, including, but not limited to, cross linked gels, such as dextran gels, may also be used with or in place of the first aqueous medium 45 and the second aqueous medium 47. The pH of either aqueous media 45 and 47 is preferably from about 5.0 to about 8.0. The temperature of the aqueous media 45 and 47 is preferably maintained at from about 20° C. to about 35° C.

An ionic transport media, such as an aqueous medium, or an electrode can also include one or more electron mediator compounds, such as thionin, pyrroloquinoline (PQQ), ferricyanide, fullerene $C_{60}$, and $[Co(tpy)_2](PF_6)_2$.

Figure 2:
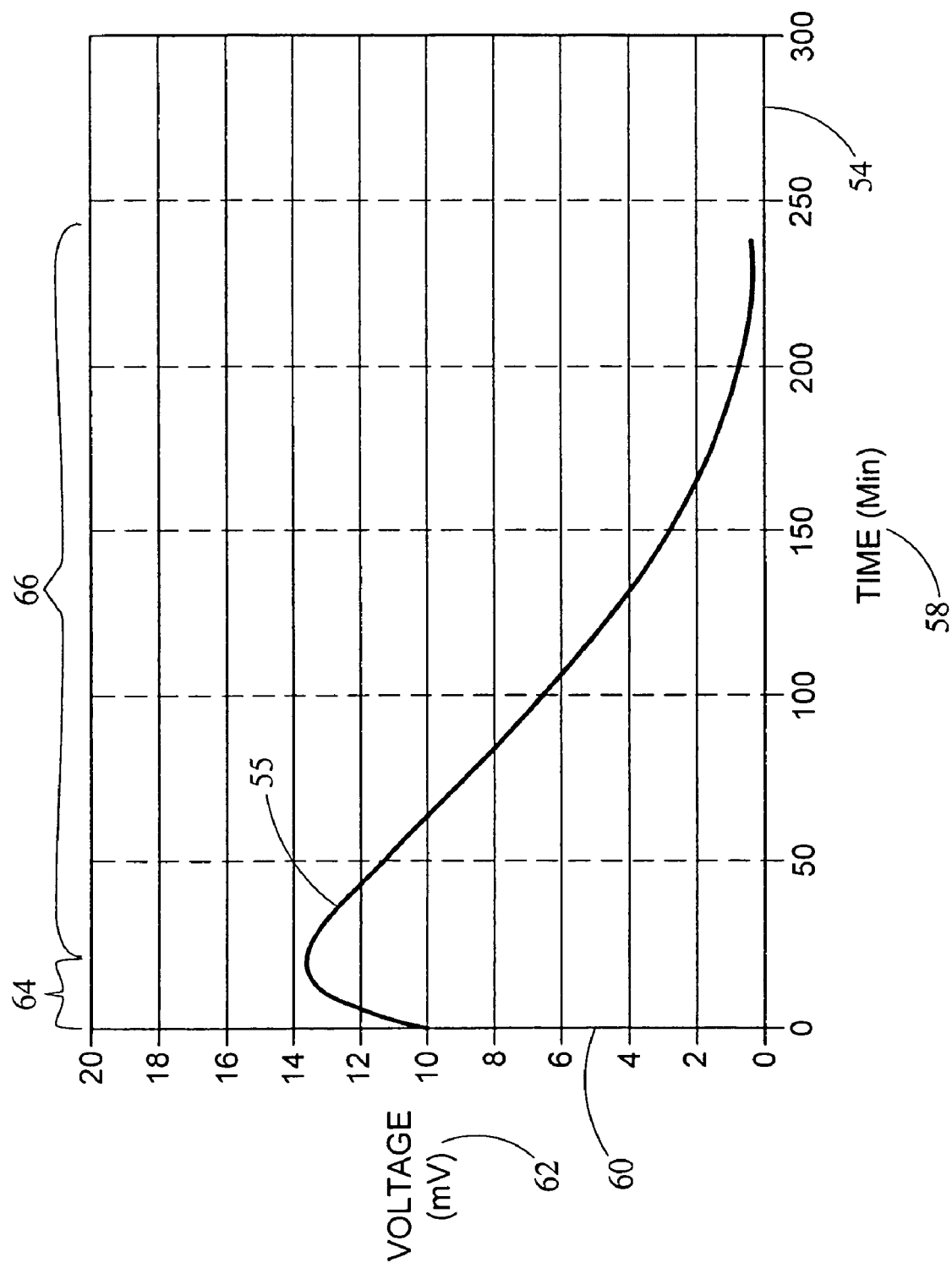
FIG. 2 depicts a graph of the potential generated by the bio-battery of FIG. 1.

The bio-battery of FIG. 1 can be used to generate an electric potential, for example as shown in FIG. 2. To generate the electrical potential 55 shown in FIG. 2, a solution of NADH 31 in the first aqueous media 45 at a 1 mg/ml concentration can be pipetted into the first cell 22. Instead of the solution of NADH 31, the stepwise addition of a solid NADH 31 and water may also be used. A concentration of ten percent or more of NADH 31 may also be used. When the NADH 31 comes into oxidizing contact with the carbon anode of the first cell 22, it is oxidized to NAD$^+$ 48, protons 36 and electrons 42. One oxidizing reaction in the presence of the anode is NADH→NAD$^+$+H$^+$+2e$^-$. An electric potential 55 is generated between the first electrode 28 and the second electrode 32 when the electrons 42 released from the carbon anode are transported to the platinum cathode, for example, through the connecting wire 44 and the resistor 46.

Meanwhile, protons 36 can diffuse from the first cell 22 to the second cell 24 through a proton exchange membrane such as a NAFION® membrane. Subsequently, oxygen molecules 35 can contact 40 the platinum cathode of the second cell 24 where oxygen molecules 35 may be combined with electrons 42 and protons, including protons 36 produced in the first cell 22, as it is reduced to water 50. One reducing reaction in the presence of the second electrode 32 is $2H^+ + \frac{1}{2}O_2 + 2e^- \rightarrow H_2O$. Stirring of an aqueous medium 45 or 47 in the first cell 22 or second cell 24 may improve mass transfer and may result in a more stable output. Since the reduction product at the platinum electrode is water 50, this bio-battery 20 may be made to be readily disposable and avoid many disposal challenges of current batteries.

FIG. 2 is a graph of the potential 55 generated by a bio-battery 20 like that depicted in FIG. 1. The x-axis 54 represents time 58 in minutes. The y-axis 60 represents voltage 62 in mV. FIG. 2 shows an initial increase in electric potential 55 over a first period of time 64, during which the NADH 31 may be consumed in the first cell 22 to generate electrical potential 55. Subsequently, the potential 55 gradually decreases over a second period of time 66, as NADH 31 may be depleted in the first cell 22. The bio-battery may create an electric current using 1 mg/ml concentration solution of NADH resulting an average maximum voltage of approximately 13.5 mV, which gradually decreases over a period of approximately six hours.

NADH 31 absorbs light at a wavelength of 340 nm and hence its oxidation in water can be monitored by tracking its decrease in spectral absorbance using a spectrophotometer. The change in potential correlates with the decrease in absorbance, hence providing evidence that the drop in electric potential is due to a decrease in the concentration of NADH 31 such as would occur when it is oxidized to $NAD^+$ 48.

A biomolecular energy source can be regenerated in any suitable manner. Regeneration of the biomolecular energy source can occur at any time prior to, during or after use of a bio-battery. The biomolecular energy source can be regenerated, for example, by using an enzyme or a microorganism. Regeneration of the biomolecular energy source can involve one or more reactions. For instance, an oxidized biomolecular energy source such as $NAD^+$ can be regenerated by a reduction reaction to increase the concentration of NADH in a bio-battery cell.

The biomolecular energy source 30 may be regenerated using a biomolecular energy source regeneration system and the biomolecular energy source may be re-oxidized to generate additional electric potential. The bio-battery 20 thus is made to be re-usable.

Figure 3:
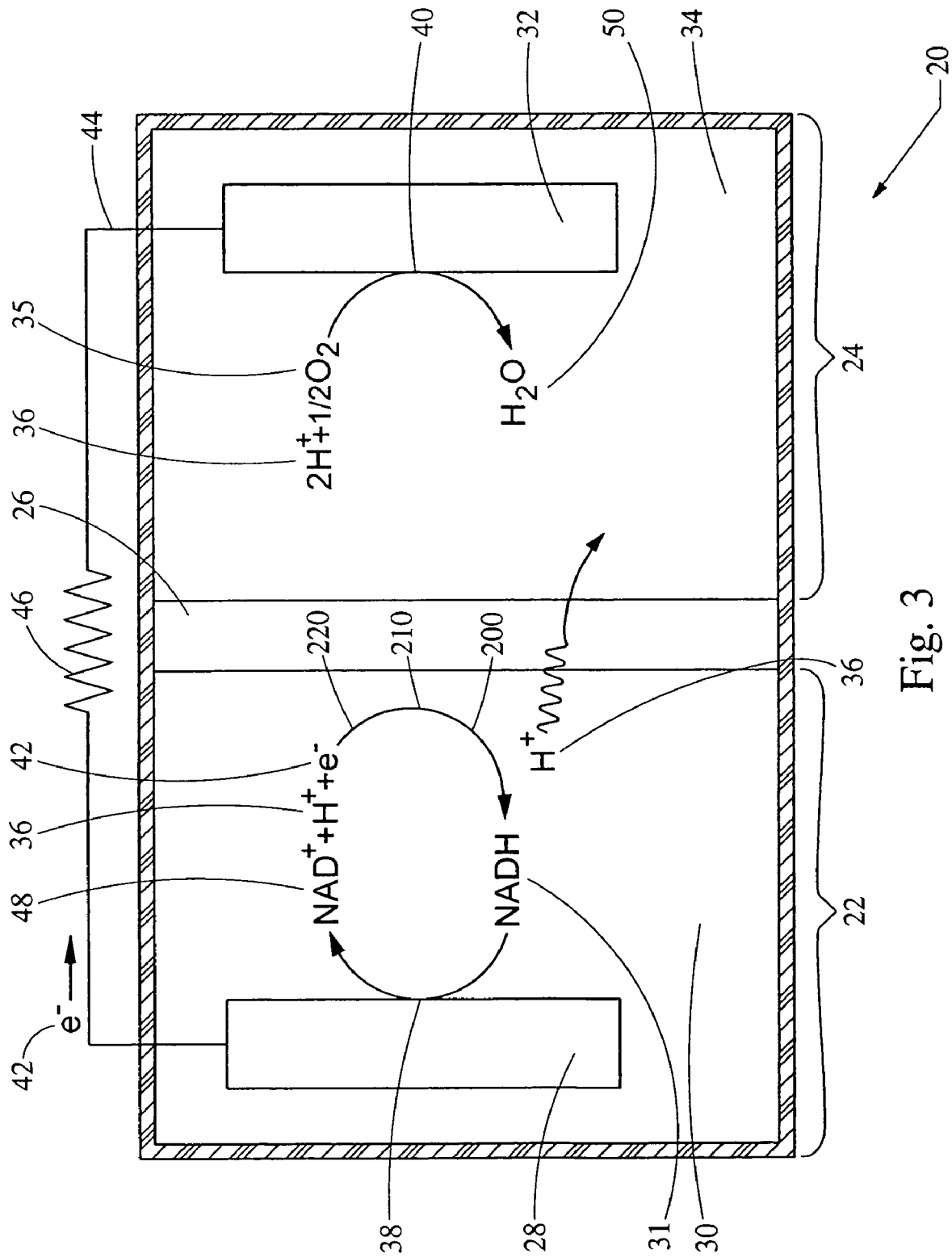
FIG. 3 depicts a schematic view of the bio-battery of FIG. 1 having a biomolecular energy source regeneration system.
Figure 4:
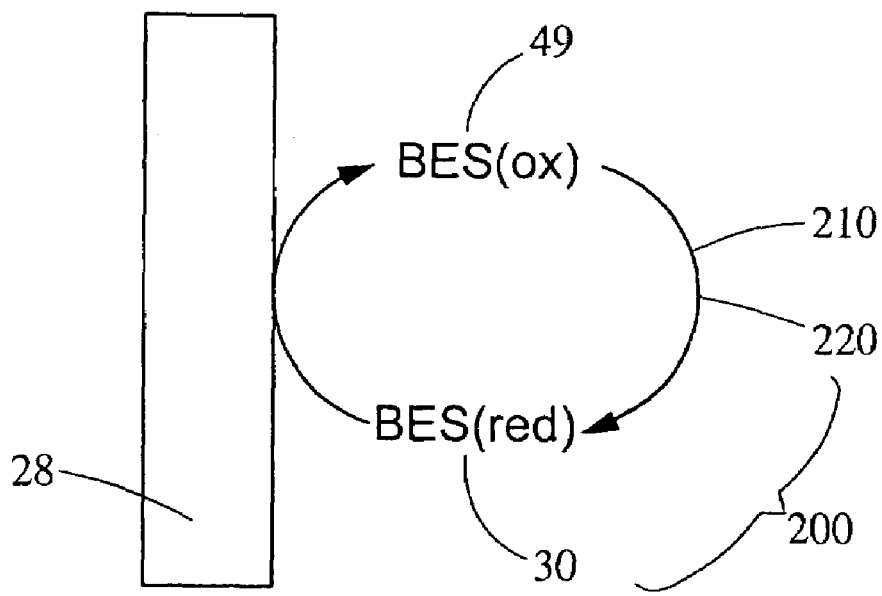
FIG. 4 depicts an enzyme system embodiment of FIG. 3 useful to regenerate the biomolecular energy source.

In another example, the bio-battery 20 may include a biomolecular energy source regeneration system 200, as depicted in FIG. 3. The biomolecular energy source regeneration system 200 can be designed to use enzymes 210 to regenerate a reduced biomolecular energy source 30, for instance as depicted in FIG. 4. The enzymes 210 may be coupled with a substrate 220 to regenerate the biomolecular energy source 30 by converting the oxidized biomolecular energy source 48 back to the reduced biomolecular energy source 30. When the reduced biomolecular energy source 30 is regenerated, it may be oxidized again to generate electric potential 55. For example, where NADH 31 is the biomolecular energy source 30, NADH 31 is oxidized to $NAD^+$ 48 to generate an electric potential 55. The enzymes 210 can be selected to convert $NAD^+$ 48, an oxidized state, back to NADH 31, a reduced state. Thereafter, the regenerated NADH 31 may be oxidized again to generate electric potential 55.

A variety of enzymes can be used to regenerate the biomolecular energy source. For example, the enzyme 210 may be selected from the group consisting of malate dehydrogenase, alcohol dehydrogenase, and lactate dehydrogenase to regenerate NADH 31. Other enzymes 210 known in the art may also be used to regenerate a biomolecular energy source. For example, lactate may be used as the substrate 220 and lactate dehydrogenase may be used as enzyme 210 to regenerate NADH 31 with pyruvate as an end product. In another example, lipoamide dehydrogenase (LipDH) with lipoamide (Lip) coupled to the oxidation of dithiothreitol (DTT) using a tungsten electrode may also regenerate NADH 31. Furthermore, the substrate 220 may be Glucose-3-phosphate and the enzymes 210 may be glucose-3-phosphate dehydrogenase, which may generate $NAD^+$ 48 to NADH 31. Similarly, the substrate 220 may be Glucose-6-phosphate and the enzymes 210 may be glucose-6-phosphate dehydrogenase, which may also generate $NAD^+$ 48 to NADH 31.

Figure 6:
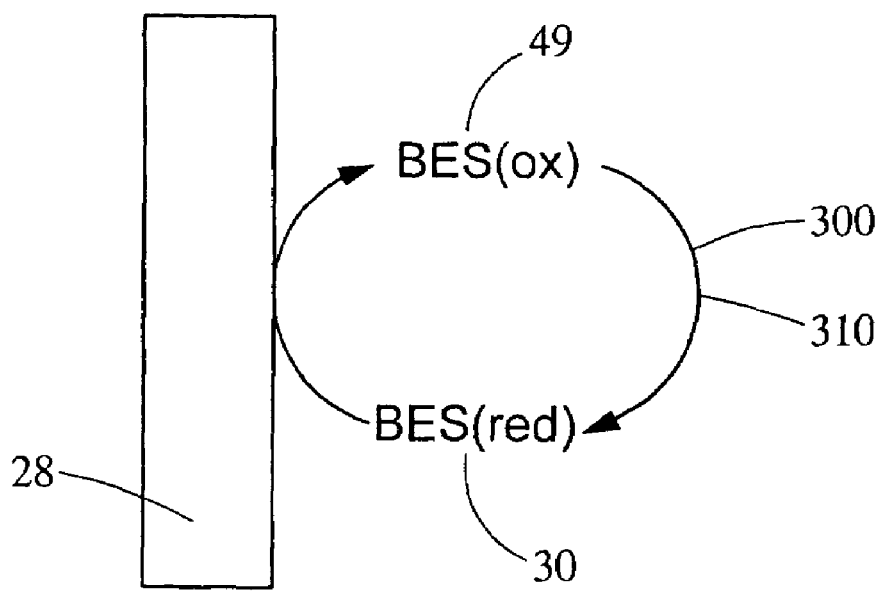
FIG. 6 depicts a microorganism embodiment of FIG. 5 useful to regenerate the biomolecular energy source.
Figure 5:
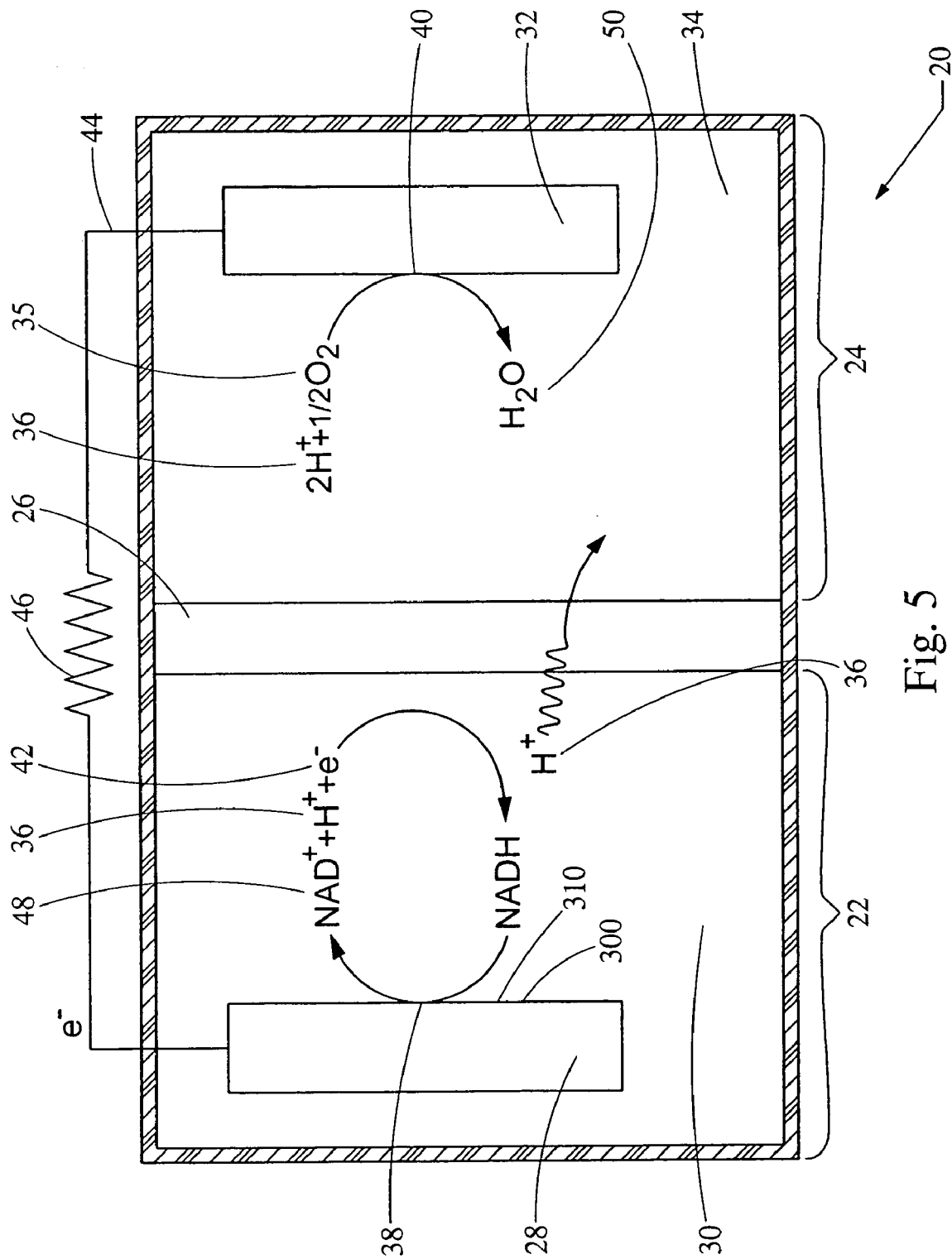
FIG. 5 depicts a schematic view of the bio-battery of FIG. 1 using microorganisms to generate the biomolecular energy source.

In another example, microorganisms 300 may be used to regenerate the biomolecular energy source 30 in the bio-battery 20, as depicted in FIG. 5 and FIG. 6. In this example, the first electrode 28 may be an iron anode and the second electrode 32 may be a gold cathode. The microorganisms 300 are maintained in contact with nutrients 310. The microorganisms 300 can be within the first cell 22 in any suitable manner, for example the microorganisms 300 can be found in a solution or preferably absorbed on the iron electrode. The anode is thereby configured to regenerate NADH 31.

As shown in FIG. 6, the microorganisms 300 may be included with nutrients 310 to regenerate the biomolecular energy source 30 by, for example, converting the oxidized biomolecular energy source 49 back to the reduced biomolecular energy source 30 through metabolism. Bacterial species, such as *Escherichia*, *Shewanella*, *Clostridium* and *Desulfovibrio*, may be capable of reducing metallic ions while oxidizing organic substrates. Also, bacteria in the family Geobacteraceae, a group of anaerobic microorganisms, may couple the oxidation of organic compounds to reduction of insoluble Fe(III) oxides. For example, *Desulfuromonas acetoxidans* is a marine microorganism known to grow anaerobically by oxidizing acetate with concomitant reduction of elemental sulfur or Fe(III). In addition, *Rhodoferax ferrireducens* can oxidize glucose to carbon dioxide and quantitatively transfer electrons to graphite electrodes.

Consequently, the microorganisms 300 may be designed to convert a spent form of a biomolecular energy source such as $NAD^+$ 48, an oxidized state, back to NADH 31, a reduced state. When the reduced biomolecular energy source 30 is regenerated, it may be oxidized again to generate electric potential 55 in the same way described above.

Kits comprising a biomolecular energy source, a first electrode and a second electrode are also provided. The kit can comprise a lyophilized biomolecular energy source. For example, the kit can comprise a biomolecular energy source, a first electrode and a second electrode. The kit can further comprise a first cell including the first electrode and the biomolecular energy source and a second cell including the second electrode. The first cell and the second cell can be joined by an electrically conducting path, such as a wire, and by a proton exchange membrane or a boundary layer near the surfaces of the electrodes to isolate an oxidation reaction from a reduction reaction. The biomolecular energy source can comprise one or more oxidizable species, including proton donating molecules. For instance, the kit can comprise NADH as a biomolecular energy source. The first cell and the second cell can be constructed in any suitable configuration, including adjacent cells, or concentric tubes. The components of the kit can be configured to allow for the addition of an ionic transport medium to the first cell or the second cell, or both. The ion transport medium can be an aqueous solution, a gel or any other suitable material that allows for the generation of an electrical potential between the first electrode and the second electrode when combined with a biomolecular energy source. The ion transport medium can be selected to dissolve a lyophilized biomolecular energy source. The kit can also include a regeneration agent to regenerate the biomolecular energy source. Examples of regeneration agents include a lyophilized enzyme and an enzyme substrate that can be dissolved in the ion transport medium, or a microorganism and other components to sustain the microorganism in the ion transport medium. The kit can further include an agent to be added to the bio-battery prior to disposal so as to promote biodegradation of the battery after use.

The kit can also include instructions related to the use and disposal of a bio-battery. Instructions can relate to assembling the bio-battery. For example, the instructions can include a description of the addition of water to a first cell to dissolve a biomolecular energy source therein, followed by use of the battery. The instructions can further include a description of the step of adding a regeneration agent to the first cell. Examples of other instructions include description of disposal of a bio-battery that comprises biodegradable material, or the addition of an agent to the bio-battery to promote the biodegradation of the bio-battery after disposal. A kit can be constructed of light-weight material and be configured in a portable design, and may be made of materials that are biodegradable after disposal.

Figure 7:
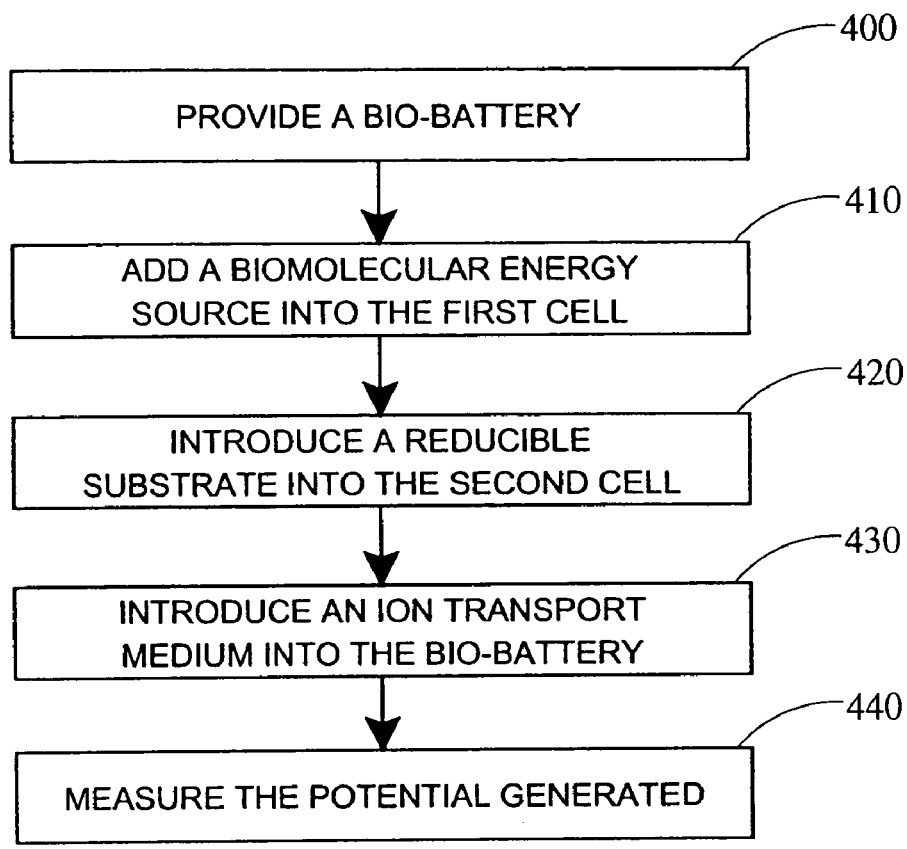
FIG. 7 depicts a flow chart for a method of generating electric potential of the bio-battery of FIG. 1.

Various methods are also provided. Unless otherwise stated, steps in methods can be performed in any suitable order. Methods of generating electric potential 55 of a bio-battery 20 are provided. A method of generating electric potential 55 of a bio-battery 20, as depicted in FIG. 7, may include providing a bio-battery 400. A bio-battery can be provided, for example, by providing a first electrode 28, such as a carbon anode, in a first cell 22 and a second electrode 32, such as a platinum cathode, in a second cell 24. The first cell 22 may be separated with the second cell 24, for example, by a proton exchange membrane 26, such as a NAFION® membrane. The first electrode 28 can be in electrically conductive communication with the second electrode 32, for example by connecting the electrodes with a wire or using the bio-battery to provide electricity. The biomolecular energy source may be added 410 into a first cell 22, for example by pipetting NADH 31 into the first cell 22. A reducible substrate 34 may be introduced 420 into a second cell 24, for example by bubbling oxygen molecules 35 into the second cell 24. An ion transport medium, for example, deionized water, may be introduced 430 into the bio-battery 20. Optionally, an electric potential 55 generated by the bio-battery may be measured 440 by, for example, using a volt meter.

Figure 8:
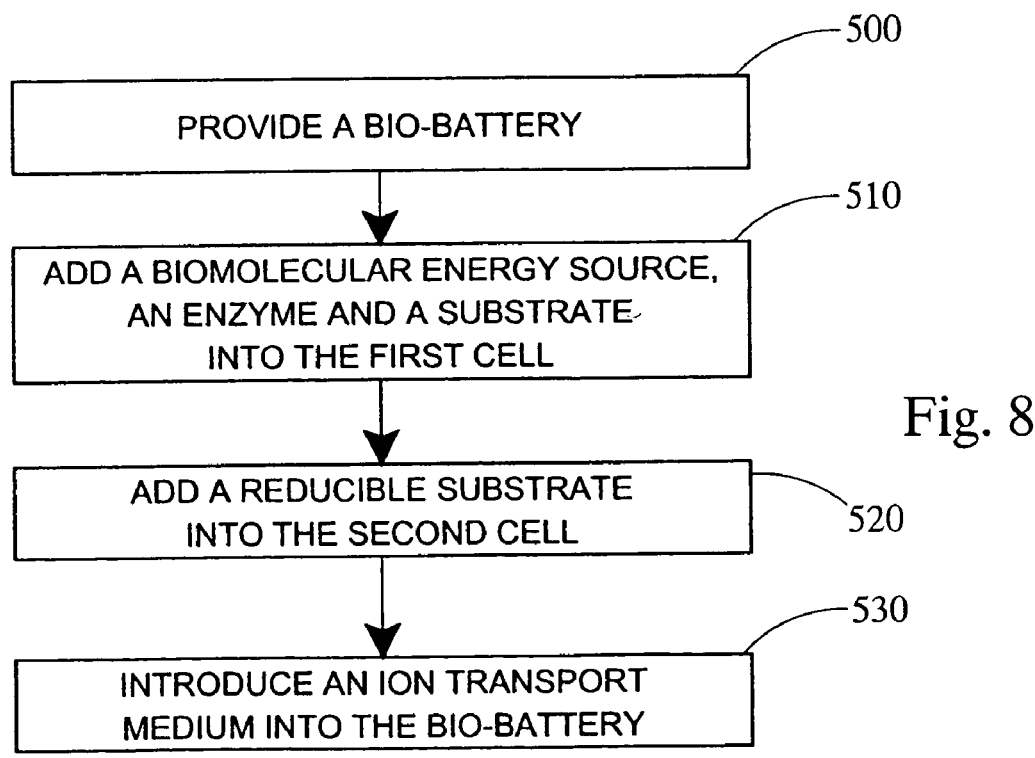
FIG. 8 depicts a flow chart for a method of regenerating the bio-battery of FIG. 1 using enzymes.

A method of regenerating a bio-battery 20 as depicted in FIG. 8, for example, may include providing a bio-battery 500. A bio-battery can be provided in various ways. For instance, a bio-battery can be provided by providing a first electrode 28, such as a carbon anode, in a first cell 22 and a second electrode 32, such as a platinum cathode, in a second cell 24. The first cell 22 may be separated with the second cell 24, for example, by a proton exchange membrane 26, such as a NAFION® membrane. The first electrode 28 can be in electrically conductive communication with the second electrode 32, such as a wire. The biomolecular energy source 30, an enzyme 210 and a substrate 220 may be added 510 into the first cell 22, for example by pipetting NADH 31 and by adding lactate dehydrogenase and lactate into the first cell 22. A reducible substrate 34 may be introduced 520 into the second cell 24, for example by bubbling oxygen molecules 35 into the second cell 24. An ion transport medium, for example, an aqueous medium 45 such as deionized water, may be introduced 530 into the bio-battery 20.

Figure 9:
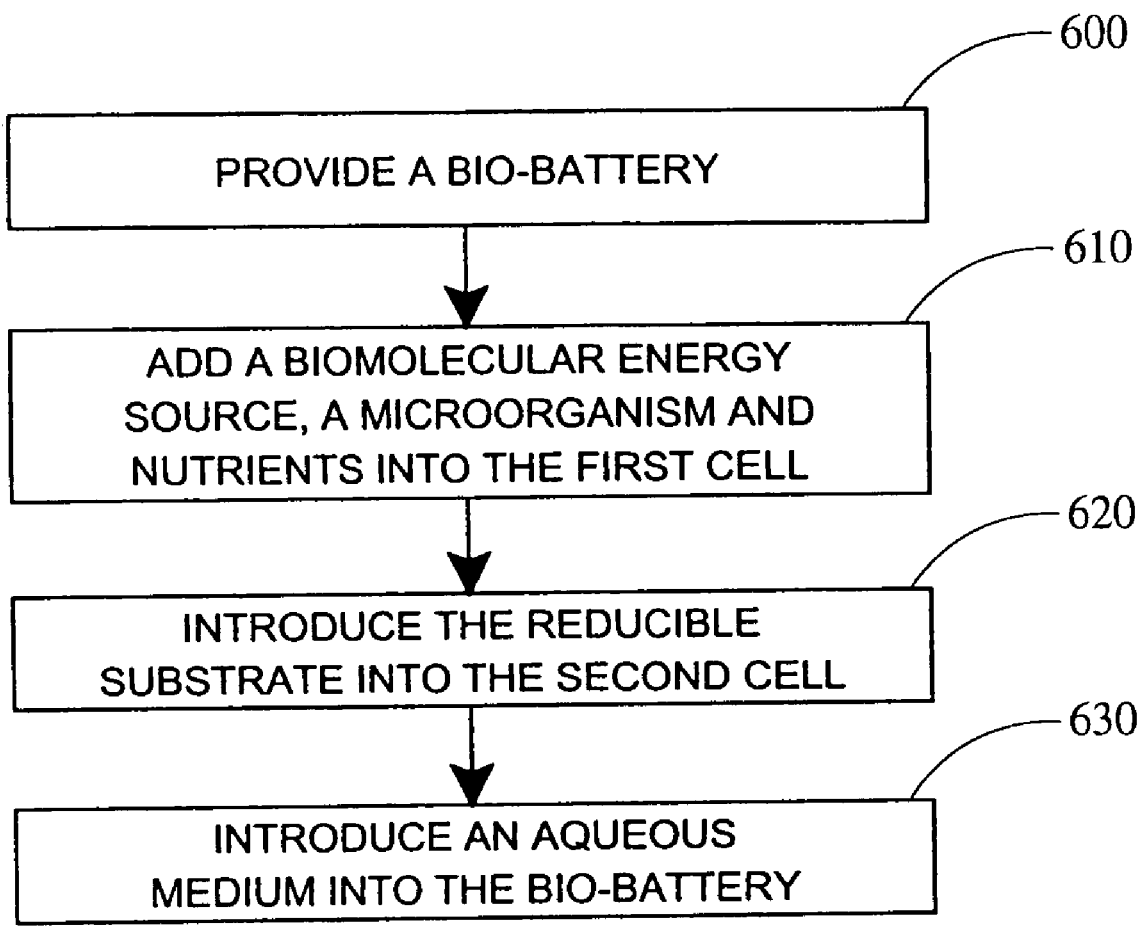
FIG. 9 depicts a flow chart for a method of regenerating the bio-battery of FIG. 1 using microorganisms.

Another method of regenerating a bio-battery 20 is depicted in FIG. 9, and includes the step of providing a bio-battery 600. The bio-battery can be provided, for example, by providing a first electrode 28, such as an iron anode, in a first cell 22 and a second electrode 32, such as a gold cathode, in a second cell 24. The first cell 22 may be separated with the second cell 24, for example, by a proton exchange membrane 26, such as a NAFION® membrane. The first electrode 28 is in electrically conductive communication with the second electrode 32, such as a wire. The biomolecular energy source 30, a microorganism 300 and nutrients 310 may be added 610 into the first cell 22, for example by pipetting NADH 31. A reducible substrate 34 may be introduced 620 into the second cell 24, for example by bubbling oxygen molecules 35 into the second cell 24. An aqueous medium 45, for example, deionized water, may be introduced 630 into the bio-battery 20.

Figure 10:
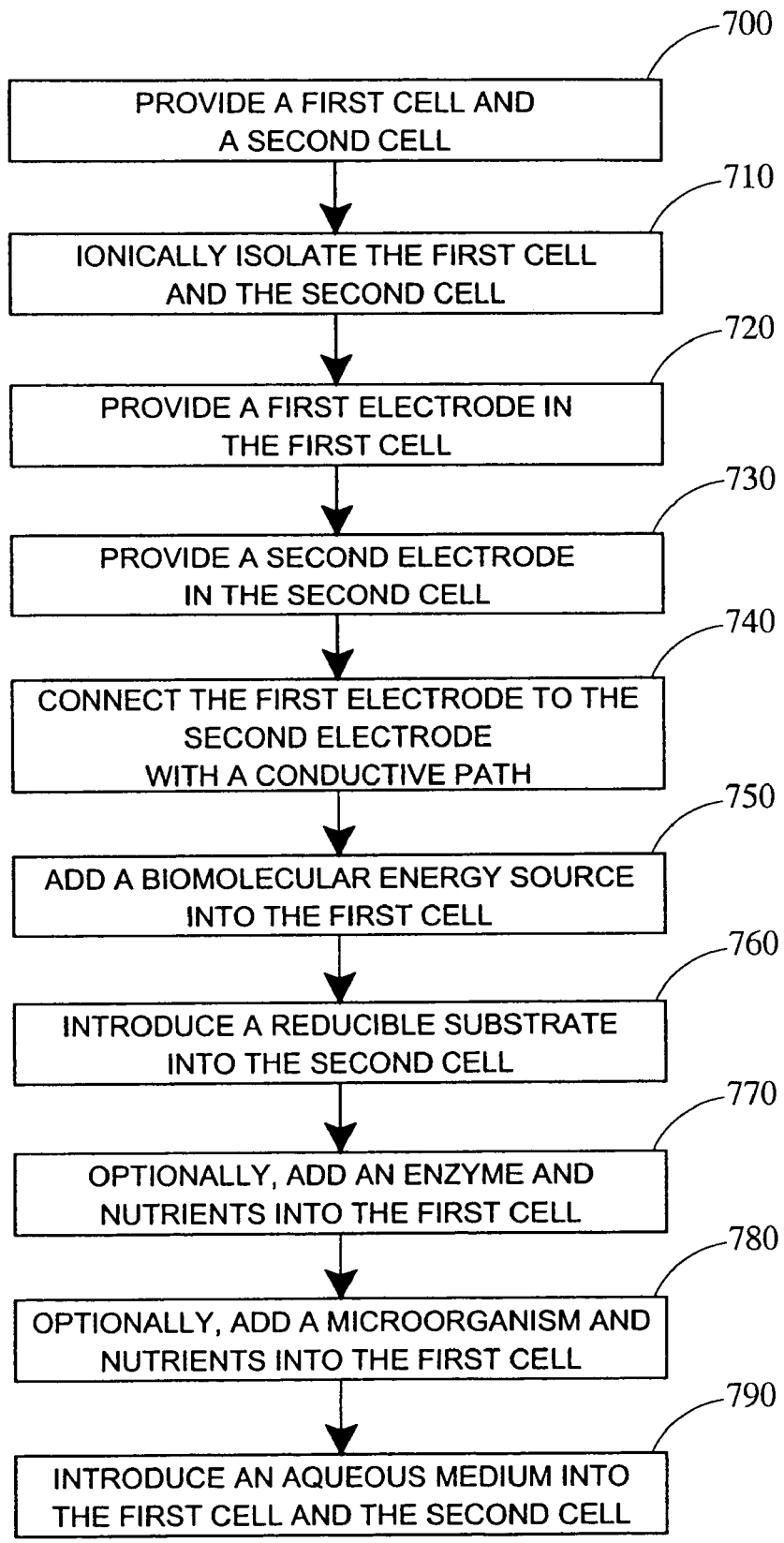
FIG. 10 depicts a flow chart for a method of manufacturing the bio-battery of FIG. 1.

A further method of manufacturing a bio-battery 20 is shown in FIG. 10. A first cell 22 and a second cell 24 may be provided 700. The first cell 22 and the second cell 24 may be ionically isolated 710, for example by providing a proton exchange membrane 26, such as a NAFION® membrane, between the two cells, or by providing a barrier layer near one or more electrodes in either or both cells. A first electrode 28 may be provided 720 in the first cell 22, such as a carbon or an iron anode. A second electrode 32 may be provided 730 in the second cell 24, such as a platinum or a gold cathode. The first electrode 28 may be connected 740 to the second electrode 32, for example with a conductive path 44 such as a wire. A biomolecular energy source 30 may be added 750 into the first cell 22, for example pipetting NADH 31 into the first cell 22. A reducible substrate 34 may be introduced 760 into the second cell 24, for example by bubbling oxygen molecules 35 into the second cell 24. Optionally, an enzyme 210 and a substrate 220 may be added 770 into the first cell 22, for example by adding lactate dehydrogenase and lactate. Optionally, a microorganism 300 and nutrients 310 may be added 780 into the first cell 22. An aqueous medium 45, for example, deionized water, may be introduced 790 into the first cell 22 and the second cell 24.

Figure 11:
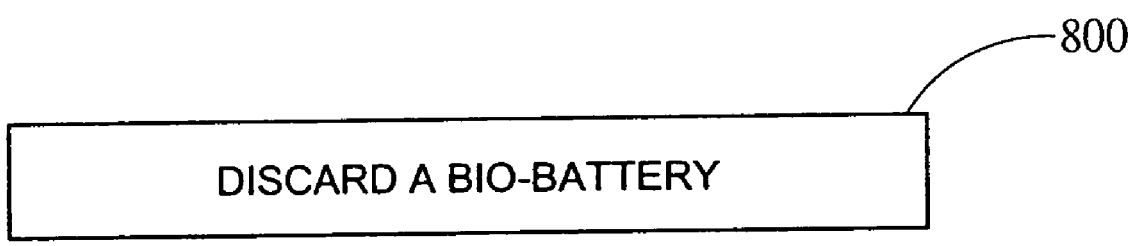
FIG. 11 depicts a flow chart for a method of disposing the bio-battery of FIG. 1.

A method of disposing a bio-battery 20, shown in FIG. 11, includes discarding a bio-battery 800. The bio-battery 20 may include a biomolecular energy source 30 in a first cell 22 and a reducible substrate 34 in a second cell 24. The first cell 22 may include a first electrode 28 and the second cell 24 may include a second electrode 32.

EXAMPLES

Example 1

NADH Bio-Battery

This example provides for the generation of an electrical potential by the oxidation of NADH in an aqueous solution. The electrical potential is on the order of about 1 micro-amp per mg amounts of NADH added to the aqueous solution. A bio-battery was constructed according to FIG. 1, using a carbon anode 38, a platinum cathode 32, and a 0.051 mm NAFION® membrane 26 separating the first cell 22 from the second cell 24. The first cell 22 and the second cell 24 both contain a aqueous deionized water ionic transport medium. NADH was added to the first cell 22 to a concentration of about 1 mg/ml solution. The temperature of the aqueous solution was maintained at about 25° C., and the pH was between about 5.0 and 8.0. Upon adding NADH to the first cell 22, the electrical potential 55 of FIG. 2 was measured.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A bio-battery comprising:
a first cell having a biomolecular energy source including a biomolecule, and a first electrode; and
a second cell having a reducible substrate and a second electrode,
where the biomolecular energy source is in ionic communication with the reducible substrate,
the first electrode is in contact with the biomolecular energy source, and
the second electrode is in contact with the reducible substrate;
wherein the addition of an ionic transport medium to the first cell generates an electrical potential between the first electrode and the second electrode in the absence of an enzyme in the first cell.

2. The bio-battery of claim 1, where the biomolecule is selected from the group consisting of NADH, NADPH and FADH.

3. The bio-battery of claim 1, where the biomolecule is NADH.

4. The bio-battery of claim 1, where the first cell comprises an ion transport medium.

5. The bio-battery of claim 1, further comprising a proton exchange membrane between the first cell and the second cell.

6. The bio-battery of claim 1, where the first electrode is an anode and the second electrode is a cathode.

7. The bio-battery of claim 1, where the reducible substrate comprises oxygen.

8. A bio-battery comprising:
a first cell having a biomolecular energy source and a carbon anode; and
a second cell containing oxygen and a platinum cathode,
where the first cell is separated from the second cell by a proton exchange membrane,
the carbon anode is in oxidizing contact with the biomolecular energy source,
the platinum cathode is in reducing contact with the oxygen, and
the biomolecular energy source is a biomolecule selected from the group consisting of NADH, NADPH and FADH; wherein the addition of an ionic transport medium to the first cell generates an electrical potential between the first electrode and the second electrode in the absence of an enzyme in the first cell.

9. A bio-battery comprising:
a first cell having a biomolecular energy source, an ion transport medium and a carbon anode in oxidizing contact with the biomolecular energy source; and
a second cell containing oxygen and a platinum cathode in reducing contact with the oxygen,
where the first cell is separated from the second cell by a proton exchange membrane,
and
the biomolecular energy source is a biomolecule selected from the group consisting of NADH, NADPH and FADH; wherein the first cell generates an electrical potential between the first electrode and the second electrode in the absence of an enzyme in the first cell.

10. A bio-battery comprising:
a first cell having a biomolecular energy source and an anode; and
a second cell containing oxygen and a gold cathode,
where the first cell is separated from the second cell by a proton exchange membrane,
the anode is in oxidizing contact with the biomolecular energy source,
the gold cathode is in reducing contact with the oxygen, and
the biomolecular energy source is an electrolytically oxidizable biomolecule selected from the group consisting of NADH, NADPH and FADH; wherein the addition of an ionic transport medium to the first cell generates an electrical potential between the first electrode and the second electrode in the absence of an enzyme in the first cell.

11. A bio-battery kit comprising: a biomolecular energy source including a biomolecule, a first electrode and a second electrode; wherein the introduction of an ion transport medium in contact with the first electrode generates an electrical potential between the first electrode and the second electrode in the absence of an enzyme when the first electrode is in ionic communication with the second electrode.

12. The bio-battery kit of claim 11, comprising a lyophilized biomolecular energy source.

13. The bio-battery kit of claim 11, further comprising a first cell including the first electrode and a second cell including the second electrode.

14. The bio-battery kit of claim 13, where the first cell comprises a biomolecular energy source.

15. The bio-battery kit of claim 13, further comprising a proton exchange membrane separating the first cell and the second cell.

16. The bio-battery kit of claim 11, further comprising an agent that promotes the biodegradation of the bio-battery after disposal.

* * * * *